United States Patent [19]
Herald, Jr. et al.

[11] Patent Number: 5,806,705
[45] Date of Patent: Sep. 15, 1998

[54] SEALING TECHNIQUE FOR HYDROPNEUMATIC PRESSURE VESSEL

[75] Inventors: Nicholas Herald, Jr., Akron; Charles T. Molina, Jr., Mayfield Heights; James C. Murphy, Chardon, all of Ohio

[73] Assignee: Essef Corporation, Chardon, Ohio

[21] Appl. No.: 986,265

[22] Filed: Dec. 5, 1997

[51] Int. Cl.⁶ ................................................ F16L 55/04
[52] U.S. Cl. ............................ 220/404; 220/530; 220/723; 138/30
[58] Field of Search ................................. 220/403, 404, 220/530, 723, 720; 138/30

[56] References Cited

U.S. PATENT DOCUMENTS

| | | |
|---|---|---|
| 3,983,902 | 10/1976 | Lord . |
| 4,321,949 | 3/1982 | Mercier . |
| 4,328,836 | 5/1982 | Petrie . |
| 4,364,416 | 12/1982 | Jacobellis et al. ................ 220/723 |
| 4,427,028 | 1/1984 | Jacobellis . |
| 4,474,215 | 10/1984 | Richter et al. . |
| 4,509,557 | 4/1985 | Sugimura . |
| 4,595,037 | 6/1986 | LeBreton et al. . |
| 4,635,814 | 1/1987 | Jones ............................. 220/723 |
| 4,671,325 | 6/1987 | Otter . |
| 4,784,181 | 11/1988 | Hilverdink . |
| 4,836,409 | 6/1989 | Lane . |
| 5,062,455 | 11/1991 | Schurter et al. . |
| 5,176,178 | 1/1993 | Schurter et al. . |
| 5,386,925 | 2/1995 | Lane . |
| 5,484,079 | 1/1996 | Carter et al. . |
| 5,542,453 | 8/1996 | Gabas . |

*Primary Examiner*—Joseph M. Moy
*Attorney, Agent, or Firm*—Pearne, Gordon, McCoy & Granger LLP

[57] ABSTRACT

A hydropneumatic pressure vessel comprising a tank wall having wall portions defining a closed cavity. A flexible elastomeric diaphragm separates the cavity into first and second fluid pressure chambers. An edge of the diaphragm is clamped between annular portions of the wall positions and other radially and axially off-set portions of the wall portions are fused to each other.

8 Claims, 3 Drawing Sheets

SEALING TECHNIQUE FOR HYDROPNEUMATIC PRESSURE VESSEL

BACKGROUND OF THE INVENTION

This invention relates to pressure vessels and, more particularly, to pressure vessels which include an elastomeric flexible diaphragm separating the interior of the tank into a compressible gas containing chamber and a liquid containing chamber. Pressure vessels of this type are normally utilized as accumulator tanks for the storage of water in a pressurized system.

Various techniques has been employed to produce a durable accumulator that will be permanently sealed against leakage and which is economical to produce. A particular problem in designing accumulator tanks is to provide a reliable seal between the pressure vessel and the diaphragm so that separation of the liquid and gas within the pressure vessel will be maintained. For example in U.S. Pat. No. 4,595,037 an upper edge portion of a flexible diaphragm functions as a seal to maintain separation of the air and the liquid within the tank and also acts as a seal between the interior and exterior of the tank. Other seal arrangements of this type may be found in U.S. Pat. Nos. 4,509,557; 4,836,409; 5,062,455; 5,542,453; 5,176,178; 4,474,215; 4,321,949; and 5,484,079. According to these patents an upper edge of the diaphragm is formed in the shape of a gasket or O-ring which is compressed between cooperating parts of the pressure vessel during assembly. According to some of the cited prior arts an adjacent portion of the diaphragm is also compressed between the assembled members. In the case of metal pressure vessels there exists the possibility of a sharp edge or burr cutting the diaphragm at the zone of compression which may result in failure, particularly since the compressed area of the diaphragm is a major flexure zone of the diaphragm. Also, again in the case of metal pressure vessels, the tank sections are assembled by a welding operation which is conducted in the area where the diaphragm is compressed between the tank sections. High welding heat may be dissipated to the compressed diaphragm and may cause heat damage thereto.

BRIEF DESCRIPTION OF THE DRAWINGS

This invention provides a technique for assembling plastic tank sections by a heat fusion technique wherein a rim sealing portion of a diaphragm is entrapped between the assembled sections to form a seal therebetween. According to this invention only an enlarged sealing rim of the diaphragm is compressed so that the remainder of the diaphragm is free from deleterious compression.

In general according to this invention a hydropneumatic pressure vessel comprises a tank wall defining an enclosed cavity. A flexible elastomeric diaphragm separates the cavity into first and second fluid pressure chambers. The diaphragm has a cup-shaped sidewall and has an radially extending rim which defines a seal. The tank wall is defined by a first wall portion having first and second annular, radially extending sealing surfaces. The first and second sealing surfaces are radially and axially offset with respect to each other. The tank wall is further defined by a second wall portion which has third and fourth annular radially extending sealing surfaces. The third and fourth sealing surfaces are radially and axially offset with respect to each other. The first and third sealing surfaces are fused to each other and the second and fourth sealing surfaces are in clamping engagement with the radially extending rim of the diaphragm to sealingly compress the rim there between. Fusion of the first and third sealing surfaces is accomplished by applying a hot plate in the shape of an annulus to these surfaces until the surface becomes molten and tacky. The surfaces are then clamped together until According to one aspect of this invention, the first wall of the hydropneumatic pressure vessel comprises a cylindrical sidewall and oblate ellipsoidal end walls with one of the end walls defining a cylindrical neck portion. The second wall of the pressure vessel comprises a cap closing and sealing an upper portion of the cylindrical neck portion of one of the end walls.

According to a further aspect of this invention the first and second wall portions of the hydropneumatic pressure vessel respectively comprise a first cylindrical sidewall having an oblate ellipsoidal end wall and a second cylindrical sidewall having an oblate ellipsoidal end wall.

According to a still further aspect of this invention the first and second wall portions of the hydropneumatic pressure vessel may comprise first and second cup-shaped plastic shells having an isotensoid shape of the type set forth in U.S. Pat. No. 5,484,079.

BRIEF DESCRIPTION OF THE DRAWINGS

Figure 1:
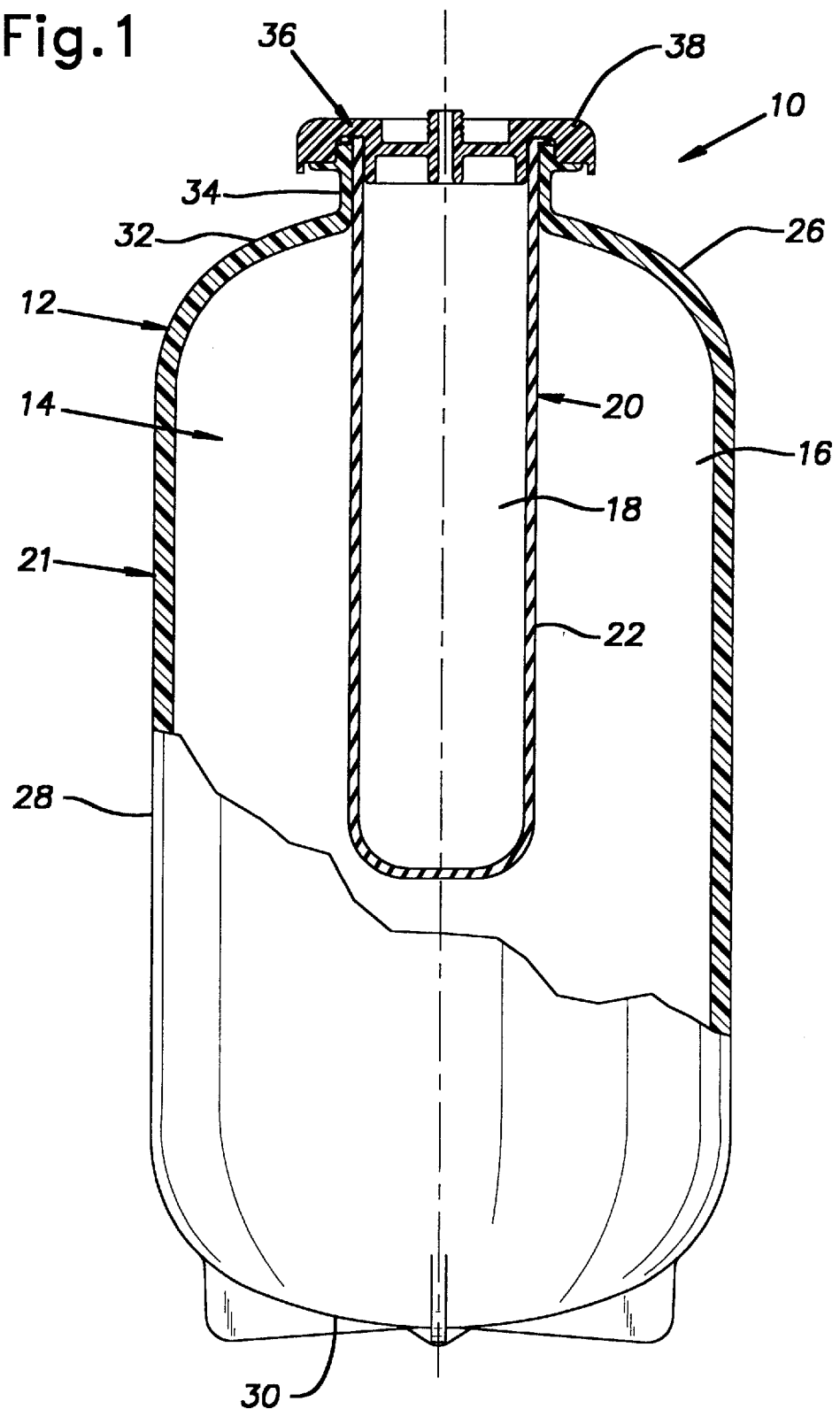
Figure 2:
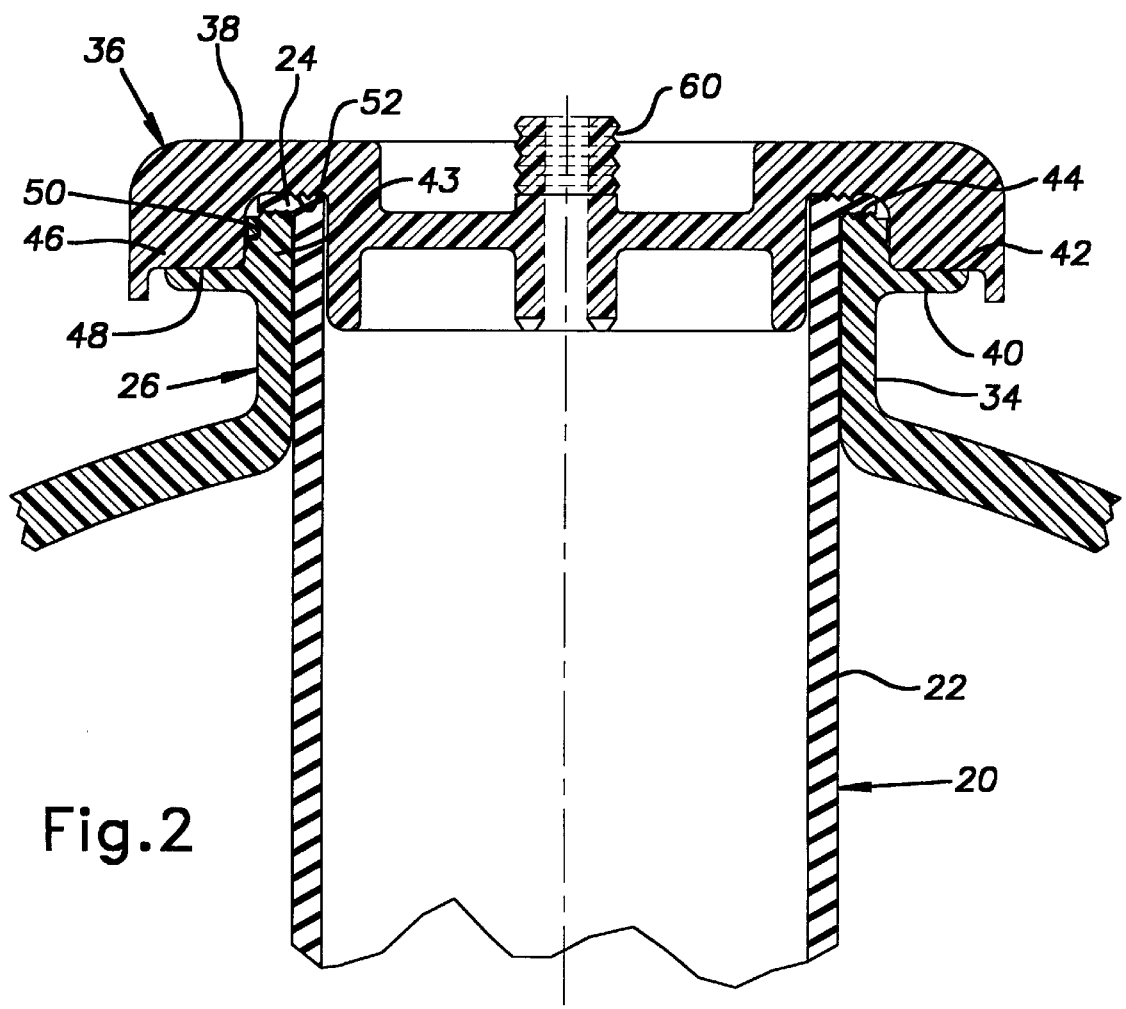
Figure 3:
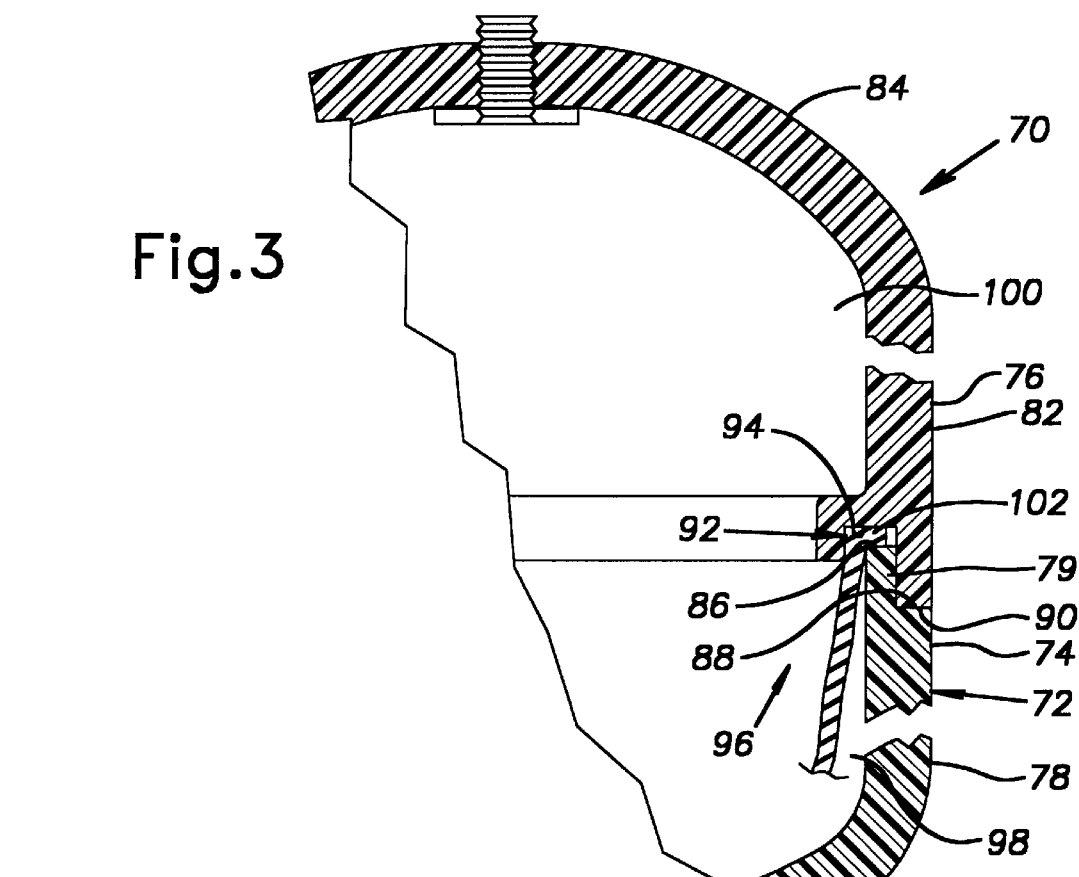
Figure 4:
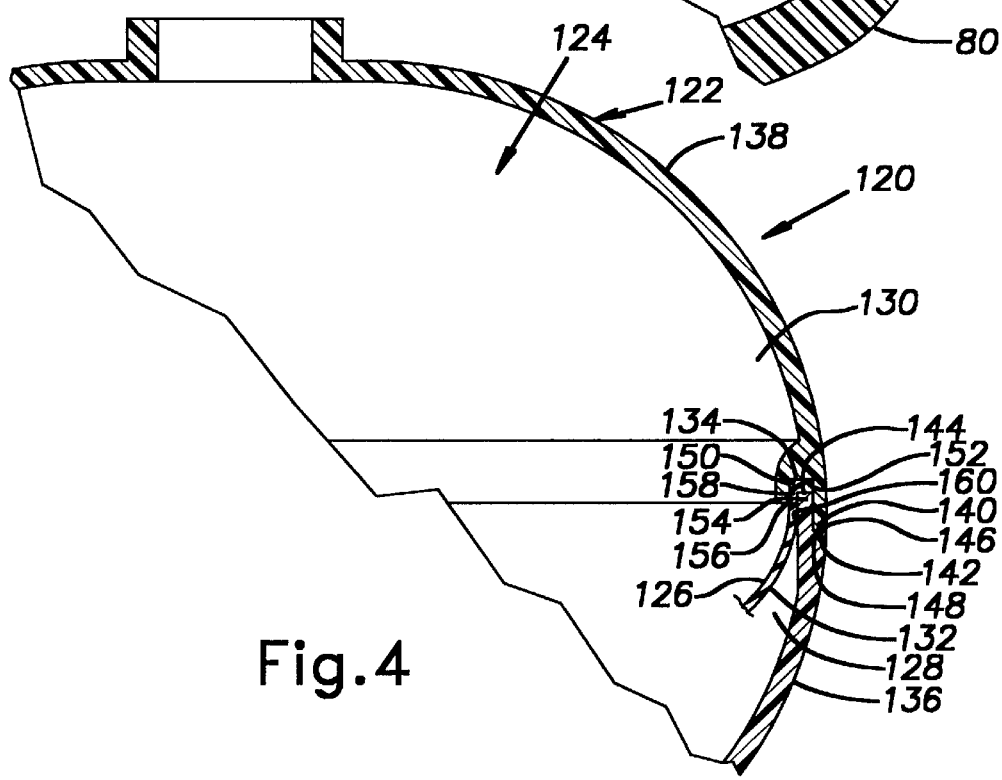

FIG. 1 is an elevational view, partly in section, of a hydropneumatic pressure vessel according to a preferred aspect of this invention;

FIG. 2 is an enlarged fragmentary view of a portion of the pressure vessel illustrated in FIG. 1;

FIG. 3 is a fragmentary elevational view of a pressure vessel according to a further aspect of this invention; and FIG. 4 is a cross sectional view of a pressure vessel according to a still further aspect of this invention.

DETAILED DESCRIPTION OF THE INVENTION

Referring now to the drawings and, particularly, to FIGS. 1 and 2 there is illustrated a hydropneumatic pressure vessel 10 according to a preferred aspect of this invention. The pressure vessel 10 comprises a tank wall 12 defining an enclosed cavity 14. The pressure vessel 10 is preferably molded from a polypropylene material. The cavity 14 is divided into first and second pressure chambers 16 and 18 respectively by a flexible elastomeric diaphragm 20. The diaphragm 20 is preferably constructed from butyl rubber. The diaphragm 20 has a cup-shaped sidewall 22 and a radially extending rim 24 which defines a seal.

The tank wall 12 is comprised of a first wall portion 26 having a cylindrical sidewall 28 and oblate ellipsoidal end walls 30 and 32. The end wall 32 defines a cylindrical neck portion 34.

The tank wall 12 is additionally defined by a second wall portion 36 which comprises a cap 38 closing and sealing an upper portion of the cylindrical neck 34.

The neck portion 34 has an annular flange 40 radially extending therefrom and comprising a first sealing surface 42. The neck portion 34 also has a cylindrical top rim portion 43 which comprises a second sealing surface 44. The first sealing surface 42 is axially spaced from the second sealing surface 44.

The cap 38 has a radial flange 46 having a third sealing surface 48. The cap 38 also has a radially inwardly spaced concentric groove 50 having an annular bottom which defines a fourth sealing surface 52.

The radially extending rim 24 of the diaphragm 20 is received in the groove 50 as is the cylindrical top rim portion 43 of the neck portion 34 so that the second sealing surface 44 compresses the rim 24 against the fourth sealing surface 52. It may be noted that the second and fourth sealing surfaces 44 and 52 may be serrated to offer a better clamping grip on the rim 24. It also may be noted in FIG. 2 that an upper portion of the diaphragm 20 is positioned between a wall of the groove 50 and a wall of the cylindrical top rim portion 43 of the neck 34 and that no compressive forces are exerted on the diaphragm other than the clamping forces on the rim 24 of the diaphragm.

The embodiment illustrated in FIGS. 1 and 2 is intended to store a liquid such as water in the diaphragm 20 so that air trapped in the first pressure chamber 16 will serve to exert pressure on the water. Water may be admitted to and drawn from the diaphragm by way of a conventional threaded fitting 60 provided in the cap 38. Of course, air may be provided in the diaphragm 20 by way of a check valve in place of the fitting 60 and the tank may be provided with another opening to admit water to and draw water from the second pressure chamber 16.

The pressure vessel 10 is assembled by placing the rim 24 of the diaphragm 20 on the second sealing surface 44. The first sealing surface 42 and the third sealing surface 48 are heat softened by applying an annular hot plate to each such surface. After the surfaces 42 and 48 are softened in this manner, the first and second wall portions 26 and 36 are assembled and are retained under clamping pressure until the sealing surfaces 44 and 48 are fused together while the rim portion 24 is clamped.

Referring now to FIG. 3 there is illustrated a hydropneumatic tank 70 according to a further aspect of this invention. The tank 70 has a tank wall 72 which comprises first and second wall portions 74 and 76 respectively. The first wall portion 74 has a cylindrical sidewall 78 provided with an oblate ellipsoidal end wall 80. The second wall portion 76 comprises a second cylindrical sidewall 82 having an oblate ellipsoidal end wall 84.

The first cylindrical sidewall 78 is provided with a cylindrical top rim portion having an annular face comprising a second sealing surface 86 and an axially spaced circumferential rim comprising a first sealing surface 88. The second cylindrical sidewall 76 has a top rim portion having an annular face comprising a third sealing surface 90. The top rim portion of the second cylindrical sidewall 76 has an annular face comprising a third sealing surface 90. The top rim portion of the second cylindrical sidewall 82 further defines an annular groove 92 which is radially inwardly spaced from the third sealing surface 90 and is axially offset therefrom. The groove 92 has an annular bottom defining a fourth sealing surface 94. A diaphragm 96 divides the interior of the tank 70 into first and second pressure chambers 98 and 100. An axially extending rim 102 of the diaphragm 96 is received in the groove 92. Similarly, a cylindrical top rim portion 79 of the first cylindrical sidewall 78 extends into the groove 92 so that the second sealing surface 86 compresses the radially extending rim 102 against the fourth sealing surface 94.

The pressure vessel 70 is assembled by placing the rim portion 102 of the diaphragm 96 on the second sealing surface 86. The first sealing surface 88 and the third sealing surface 90 are heat softened by applying an annular hot plate to each such surface. After the surfaces 88 and 90 are softened in this manner, the first and second wall portions 72 and 76 are assembled and are retained under clamping pressure until the sealing surfaces 88 and 90 are fused together while the rim portion 102 is clamped between the sealing surfaces 94 and 86.

Referring now to FIG. 4 there is illustrated a hydropneumatic pressure vessel 120 according to a still further aspect of this invention. The pressure vessel 120 comprises a tank wall 122 defining an enclosed cavity 124. A flexible elastomeric diaphragm 126 separates the cavity 124 into first and second fluid pressure chambers 128 and 130. The diaphragm has a cup-shaped sidewall 132 and a radially extending rim 134 defining a seal.

The tank wall 122 is formed by first an second cup-shaped plastic members 136 and 138. The members 136 and 138 may be injection molded or formed by a variety of other molding techniques. The members 136 and 138 have circular open mouth end portions having first and second end faces 140 and 142, respectively. The end faces 140 and 142 make end face-to-face apposition to form an outer surface which has a curvature which is preferably geodesic or isotensoid in accordance with the teachings of U.S. Pat. No. 5,484,079.

The end face 140 has an annular face which comprises a second sealing surface 144 and an axially spaced circumferential rim which comprises a first sealing surface 146. The end face 142 has an annular face which comprises a third sealing surface 148 and an annular groove 150 which is radially and inwardly spaced from the third sealing surface 148 and is axially offset therefrom. The groove 150 has an annular bottom defining a fourth sealing surface 152. The radially extending rim 134 of the diaphragm 126 is received in the groove 150 as is a top rim portion 154 of the end face 140. The second sealing surface 144 compresses the radially extending rim 134 against the fourth sealing surface 152. It may be noted that an upper portion 156 of the diaphragm 132 is positioned between a wall 158 of the groove 150 and a wall 160 of the top rim portion 154, but is not compressed by these walls.

Prior to assembly of the cupped shaped members 136 and 138, the first and third sealing surfaces 146 and 148 are heated by an annular hot plate until the surfaces thereof are heat softened. While the surfaces are soft and tacky, and with the diaphragm 126 mounted in its illustrated position, the cup-shaped members 136 and 138 are clamped in face-to-face apposition to compress the rim portion 134 of the diaphragm between the second and fourth clamping surfaces to fuse the cup-shaped members together. Pressure is released after the members 136 and 138 are fused together.

Although the preferred embodiment of this invention has been shown and described, it should be understood that various modifications and rearrangements of the parts may be restored to without departing from the scope of the invention as disclosed and claimed herein.

What is claimed:

1. A hydropneumatic pressure vessel comprising a tank wall defining an enclosed cavity, a flexible elastomeric diaphragm separating said cavity into first and second fluid pressure chambers, said diaphragm being a cup-shaped and having a radially extending rim defining a seal, said tank wall being defined by a first wall portion having first and second annular, radially extending sealing surfaces, said first and second sealing surfaces being radially and axially offset with respect to each other, said tank wall being further defined by a second wall portion having third and fourth, annular radially extending sealing surfaces, said third and fourth sealing surfaces being radially and axially offset with respect to each other, said first and third sealing surfaces being fused to each other and said second and fourth sealing surfaces being in clamping engagement with said radially extending rim to sealingly compress said rim therebetween.

2. A hydropneumatic pressure vessel according to claim 1 wherein said first wall comprises a cylindrical sidewall and oblate ellipsoidal end walls with one of said end walls defining a cylindrical neck portion, and wherein said second wall comprises a cap closing and sealing an upper portion of said cylindrical neck portion of said one of said end walls.

3. A hydropneumatic pressure vessel according to claim 2 wherein a valve fitting is provided in said cap for admitting a pressurizing fluid to said first pressure chamber.

4. A hydropneumatic pressure vessel according to claim 2 wherein said neck portion has a cylindrical portion having an annular face comprising said second sealing surface, an annular flange radially extending from said neck portion and axially spaced from said top rim to comprise said first sealing surface, said cap having a radial flange comprising said third sealing surface and having a radially inwardly spaced concentric groove, said flanges being fused to each other, said groove having an annular bottom defining said fourth sealing surface said radially extending rim of said diaphragm being received in said groove, said cylindrical top rim portion extending into said groove so that its said second sealing surface compresses said radially extending rim against said fourth sealing surface with an upper portion of said diaphragm being positioned between a wall of said groove and a wall of said cylindrical top rim.

5. A hydropneumatic pressure vessel according to claim 1 wherein the first and second wall portions of said tank wall respectively comprise a first cylindrical sidewall having an oblate ellipsoidal end wall and a second cylindrical sidewall having an oblate ellipsoidal wall.

6. A hydropneumatic pressure vessel according to claim 1 wherein said first and second wall portions have isotensoid surfaces.

7. A hydropneumatic pressure vessel according to claim 5 wherein said first cylindrical sidewall has a cylindrical top rim portion having an annular face comprising said second sealing surface and an axially spaced circumferential rim comprising said first sealing surface wherein, said second cylindrical sidewall has a top rim portion having an annular face comprising said third sealing surface wherein the top rim portion of said second cylindrical sidewall further defines an annular groove which is radially inwardly spaced from said third sealing surface and is axially offset therefrom, said groove having an annular bottom defining said fourth sealing surface, said radially extending rim of said diaphragm being received in said groove, said cylindrical top rim portion of said first cylindrical sidewall extending into said groove so that its said second sealing surface compresses said radially extending rim against said fourth sealing surface with an upper portion of said diaphragm being positioned between a wall of said groove and a wall of said cylindrical top rim.

8. A hydropneumatic pressure vessel according to claim 6 wherein said first cylindrical sidewall has a cylindrical top rim portion having an annular face comprising said second sealing surface and an axially spaced circumferential rim comprising said first sealing surface wherein, said second cylindrical sidewall has a top rim portion having an annular face comprising said third sealing surface wherein the top rim portion of said second cylindrical sidewall further defines an annular groove which is radially inwardly spaced from said third sealing surface and is axially offset therefrom, said groove having an annular bottom defining said fourth sealing surface, said radially extending rim of said diaphragm being received in said groove, said cylindrical top rim portion of said first cylindrical sidewall extending into said groove so that its said second sealing surface compresses said radially extending rim against said fourth sealing surface with an upper portion of said diaphragm being positioned between a wall of said groove and a wall of said cylindrical top rim.

\* \* \* \* \*